Jan. 4, 1944.  H. R. MOORE  2,338,129
METHOD OF DETERMINING THE RATE OF DRYING OF COATINGS
Filed Dec. 19, 1941

INVENTOR
BY *Howard R. Moore*
ATTORNEY

Patented Jan. 4, 1944

2,338,129

UNITED STATES PATENT OFFICE 2,338,129

METHOD OF DETERMINING THE RATE OF DRYING OF COATINGS

Howard R. Moore, Drexel Hill, Pa.

Application December 19, 1941, Serial No. 423,604

1 Claim. (Cl. 73—51)

(Granted under the act of March 3, 1883, as amended April 30, 1928; 370 O. G. 757)

This invention relates to a method of and apparatus for determining the surface tackiness and through drying characteristics and rates of protective coatings applied in a liquid state, such as paints, varnishes, and the like.

Briefly, this invention relates to a method for measuring the state of surface tackiness of protective coatings as a function of the time of drying on exposure to air of definite temperature and moisture content. The only measurement required is the time in seconds required for a steel ball to pass between two points on an inclined plane. As the coating dries, the speed of roll of the ball gradually approaches the time characteristic of the speed of travel thereof over an uncoated plate glass surface. While it is recognized that this invention takes advantage of a very simple physical principle, namely, the law of a frictionless body traveling down an inclined plane, the application of this principle to the determination of the drying properties of protective coatings is new and without precedent.

Measured deviations from theoretical speeds may be fully accounted for by the relative differences in adhesion of a steel ball and/or other contact elements of metallic nature traveling over different coatings. With respect to uncoated plate glass, published data show that rolling friction coefficients vary with the nature of the plane as well as the rolling object. In the case under consideration, the rolling friction coefficients of a steel ball versus glass are a function of the presence of dust particles, air resistance, and the conformity of the glass and steel to ideal "flatness" and roundness, respectively. In general, the coefficients of rolling friction of a steel ball versus plate glass and most types of metal surfaces may be neglected in comparison to the much larger apparent coefficients due to the varying amounts of adhesion set up by film-forming compositions between the glass substratum and the rolling ball.

One of the objects of the present invention is the provision of an improved device of the character described, by means of which the tackiness and through dry of a coating may quickly and easily be tested by a dynamic method in which an object is rolled over a surface covered with a film of the coating being tested and its rate of travel timed between two predetermined points. While this method measures the disappearance of tack as a function of time, systematic variations of the degree of inclination and the weight of the ball permits deductions to be drawn on the through drying characteristics of the film as well as surface tack.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claim.

In order to make the invention more clearly understood, there are shown in the accompanying drawing, means for carrying the invention into practical use, without limiting the improvements in their useful application to the particular construction, which, for the purpose of explanation, have been made the subject of illustration.

Figure 1:
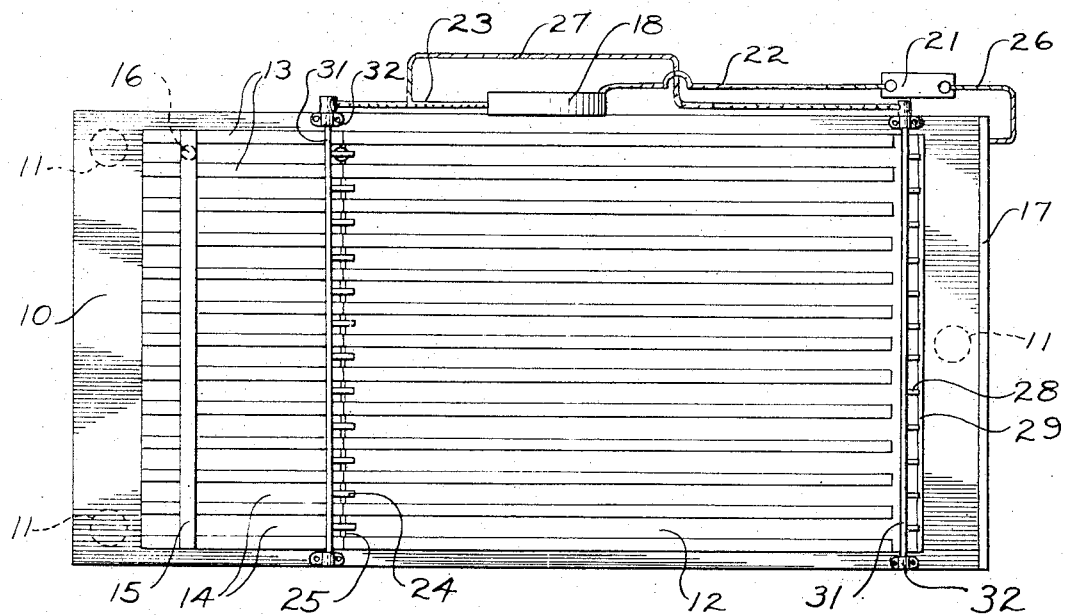
Fig. 1 is a plan view of a testing device constructed in accordance with the present invention.
Figure 2:
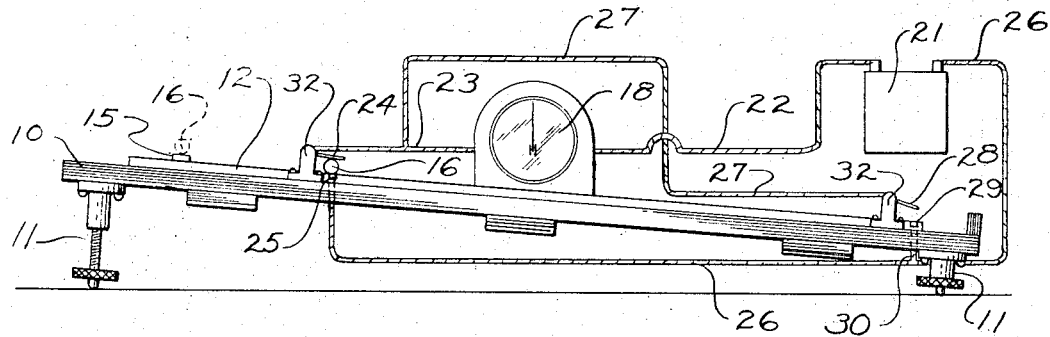
Fig. 2 is a side elevational view of the structure shown in Fig. 1, certain parts being illustrated diagrammatically.

Referring to the drawing, a testing apparatus embodying the invention is shown as comprising an inclined support 10 mounted at its upper and lower ends by adjustable legs 11 by means of which the angle of inclination of the support may be varied as desired. Superimposed upon the support 10 is a sheet of plate glass 12 having a plurality of strips of masking tape 13 secured thereto and extending longitudinally thereof in parallel spaced relation to provide a series of runways 14. Several strips of tape 15 are applied one over each other transversely across the glass plate 12 adjacent to the upper edge thereof to define a starting line for the rolling object, herein shown as consisting of a steel ball 16, and a strip 17 forming a backstop, is secured across the lower edge of the support 10 to arrest the movement of the ball after traversing its runway.

In operation, one or all of the runways is covered with a smooth film of uniform thickness of the coating to be tested which may be paint, varnish, or the like, which is allowed to dry for a predetermined time until it reaches a sufficient degree of firmness to permit of the proper test. The ball 16 is then released at the starting line and permitted to roll down a runway 14 under the influence of gravity and over the film being tested, and its rate of travel between two predetermined points therealong timed by any suitable means, such as by a stop watch, photoelectric cell or electric contact system, the latter being diagrammatically shown for the purpose of simplicity and clearness.

Figure 3:
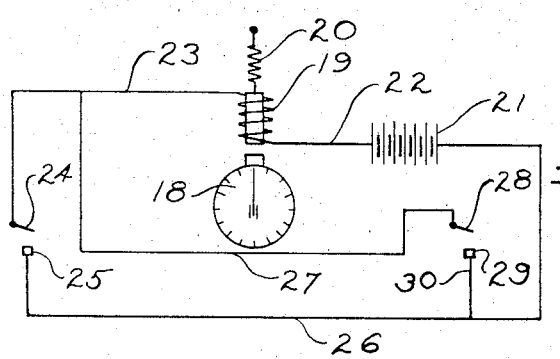
Fig. 3 is a diagrammatic view of the timing circuit.

This system embodies a stop watch 18 of commercial design which is so mounted as to be started and stopped by a solenoid 19, Fig. 3, which is normally held out of engagement therewith by a spring 20. The solenoid 16 is at times energized by electric current from a battery 21 which traverses two circuits, a watch starting circuit and a watch stopping circuit. The watch starting circuit comprises a wire 22, winding of solenoid 19, wire 23, contacts 24 and 25, which are located at the starting point of a measured stretch along a runway 12 and which are bridged by a ball 16 released at the starting line 15, and wire 26 back to battery 21. The watch stopping circuit includes the wire 22, winding of solenoid 19, wires 23 and 27, contacts 28 and 29, which are located at the end of the measured stretch along the runway 12 and which are also bridged by the ball 16 to close the circuit as soon as it completes its run over said stretch, and wires 30 and 26 back to the battery 21.

Thus, it will be apparent that when a ball 16 is released and develops the desired speed down its runway it momentarily closes the starting circuit first traced so as to energize the solenoid 19 and cause its armature acting against the spring 20 to start the operation of the stop watch 18. As soon as the ball passes the starting mark it opens the circuit through the contacts 25, 25 and permits the spring to retract the armature of the solenoid 19, the stop watch 18 continuing to run in the usual manner. When the ball reaches the end of its run along the measured distance it bridges the contacts 28, 29 and closes the watch stopping circuit previously traced, causing the solenoid to again become energized and stop the operation of the stop watch 18. It will be noted that the watch starting and stopping circuits are closed successively and that when one is closed the other is open. The lower contacts 25 and 29 may be in the form of a metallic bar or wire extending across all of the runways 12, being as nearly as possible flush therewith, and that the upper contacts 24 and 28 may be in the form of a plurality of flexible leaf contacts overhanging the runways and mounted on bus bars 31 carried by brackets 32 secured to the support 10. At the conclusion of the tests the film of coating may quickly and easily be scraped from the smooth glass surface in preparation for subsequent tests.

It will be understood that the above described timing means is given by way of example only and that other automatic timing mechanism may be substituted therefor. Also, an automatic ball release mechanism may be provided, if so desired.

From the foregoing it will be apparent that this method is a dynamic one, since the rolling ball subjects the films to only momentary contact at any particular point of travel. Because of this momentary contact, averaging 0.006 second per millimeter for an angle of 40 minutes, the velocity of the ball is not influenced by the plastic yield value and/or flexibility of resilience of the films, as is the case with other methods. Also, since the velocities of the rolling ball are independent of film thickness variations over a very wide range, the data obtained permit definite conclusions to be drawn on the state of through dry and residual tack present after definite periods of drying of various protective coatings. The existing static methods for determining surface hardness and print free characteristics of films, subject the films to varying pressures, resulting in appreciable distortions due to the plasticity of the films, thus giving erronous results with no bearing on the amount of surface tack present. The present method, on the other hand, gives quantitative measurements of tack that are independent of the yield value and flexibility characteristics of the underlying portions of the films.

The unique dual ability of the rolling ball apparatus to give reliable data on surface tack and ultimate through dry as controlled by the time of drying are of inestimable value for both manufacturers and consumers of protective coatings, since the results can be checked by different observers and are free from personal bias. The method is theoretically sound, because the films are not modified or distorted in any way in the act of performing measurements.

The method is applicable to all types of coatings which "cure" or acquire their characteristic freedom from tack or stickiness by evaporation of thinners alone, or by evaporation of thinners plus oxidation or polymerization conversion, or by a combination of these three processes. The drying rates of clear cellulose and cellulose derivative coatings, clear oleo-resinous varnishes, alkyd resins, and drying oils of all kinds, as well as pigmented compositions of these vehicles, may all be evaluated according to this invention.

The effect of varying the conditions of temperature and relative humidity in the atmosphere in which measurements are carried out can be readily evaluated with this apparatus. The method gives a quantitative measure of these effects and hence is of great interest from a practical point of view. The method is so sensitive that it will register the effects of the ripening of varnishes due to readjustments in the colloid equilibrium of the metallo-organic driers present. The effects of time of storage in a container and progressive drier absorptions by vehicle and pigment constituents can easily be ascertained.

The method has practical significance in evaluating the degree of "after-tack" of soft oil substitutes for tung oil in varnishes. Heretofore, it was possible only to express the "after-tack" in terms of the qualitative nomenclature of the touch system.

This apparatus takes cognizance of the fact that the drying of varnishes is a continuous process, and that the arbitrary stages of drying hitherto characterized as "set-to-touch," "dry-hard," and "tack-free" by the touch system are misleading and without significance. Careful tests with different observers indicate that the first reading that can be obtained with this apparatus, as the coating dries, corresponds to the "set-to-touch" stage. As contrasted to these qualitative designations, however, the present method gives integers representing intermediate drying rates and ultimate surface drying characteristics under definite conditions of temperature and humidity.

Since the method is theoretically sound, it gives correct data for the surface hardness of alkyd resins which heretofore received a low rating because of their comparatively high flexibility.

The method permits for the first time a classification of both clear and pigmented coatings relative to the degree of through dry and freedom from surface tack they attain at the end of any arbitrary period of time. This classification is of great assistance in evaluating the degree of improvement secured in formulating new coatings for specific purposes.

It will be understood that the above description and accompanying drawing comprehend only the general and preferred embodiment of the invention, and that various changes in construction, proportion and arrangement of the parts may be made within the scope of the appended claim without sacrificing any of the advantages of the invention.

The invention described herein may be manufactured and used by or for the Government of the United States of America for governmental purposes without the payment of any royalties thereon or therefor.

I claim:

A method of determining the rate of drying of a coating which consists in applying a film of the coating in a liquid state to an inclined surface; permitting said film to dry for a predetermined interval of time; rolling an object down said surface and over said coating under the influence of gravity; and timing the rate of travel of said object down said surface between two predetermined points.

HOWARD R. MOORE.